(12) United States Patent
Vdovina et al.

(10) Patent No.: US 10,520,618 B2
(45) Date of Patent: Dec. 31, 2019

(54) POYNTING VECTOR MINIMAL REFLECTION BOUNDARY CONDITIONS

(71) Applicants: Tetyana Vdovina, Spring, TX (US); Valeriy Brytik, Houston, TX (US); John E. Anderson, Houston, TX (US); Thomas A. Dickens, Houston, TX (US); William Curry, Houston, TX (US); Carey M. Marcinkovich, The Woodlands, TX (US)

(72) Inventors: Tetyana Vdovina, Spring, TX (US); Valeriy Brytik, Houston, TX (US); John E. Anderson, Houston, TX (US); Thomas A. Dickens, Houston, TX (US); William Curry, Houston, TX (US); Carey M. Marcinkovich, The Woodlands, TX (US)

(73) Assignee: ExxohnMobil Upstream Research Company, Spring, TX (US)

( * ) Notice: Subject to any disclaimer, the term of this patent is extended or adjusted under 35 U.S.C. 154(b) by 699 days.

(21) Appl. No.: 14/887,621

(22) Filed: Oct. 20, 2015

(65) Prior Publication Data
US 2016/0223697 A1 Aug. 4, 2016

Related U.S. Application Data

(60) Provisional application No. 62/111,956, filed on Feb. 4, 2015.

(51) Int. Cl.
*G01V 1/28* (2006.01)
*G01V 1/30* (2006.01)
*G06F 17/50* (2006.01)

(52) U.S. Cl.
CPC ............... *G01V 1/282* (2013.01); *G01V 1/30* (2013.01); *G01V 2210/30* (2013.01);
(Continued)

(58) Field of Classification Search
CPC .... G01V 1/282; G01V 2210/679; G01V 1/28; G01V 2210/67; G01V 2210/51;
(Continued)

(56) References Cited

U.S. PATENT DOCUMENTS 3,812,457 A 5/1974 Weller
3,864,667 A 2/1975 Bahjat
(Continued)

FOREIGN PATENT DOCUMENTS

CA 2 796 631 11/2011
EP 1 094 338 4/2001
(Continued)

OTHER PUBLICATIONS

Anil Zenginoglu, "Hyperboloidal layers for hyperbolic equations on unbounded domains", Journal of Computational Physics 230 (2011) 2286-2302 (Year: 2011).*

(Continued)

*Primary Examiner* — Akash Saxena
(74) *Attorney, Agent, or Firm* — ExxonMobil Upstream Research Company—Law Department (57) ABSTRACT

A method for exploring for hydrocarbons, including: simulating a seismic waveform, using a computer, wherein computations are performed on a computational grid representing a subsurface region, said computational grid using perfectly matched layer (PML) boundary conditions that use an energy dissipation operator to minimize non-physical wave reflections at grid boundaries; wherein, in the simulation, the PML boundary conditions are defined to reduce computational instabilities at a boundary by steps including, representing direction of energy propagation by a Poynting vector, and dissipating energy, with the dissipation operator, in a direction of energy propagation instead of in a phase velocity direction; and using the simulated waveform in
(Continued)

performing full waveform inversion or reverse time migration of seismic data, and using a physical property model from the inversion or a subsurface image from the migration to explore for hydrocarbons.

4 Claims, 2 Drawing Sheets

(52) U.S. Cl.
CPC .... *G01V 2210/50* (2013.01); *G01V 2210/614* (2013.01); *G01V 2210/626* (2013.01); *G01V 2210/67* (2013.01); *G06F 17/5009* (2013.01); *G06F 2217/16* (2013.01)

(58) Field of Classification Search
CPC .......... G01V 99/005; G01V 1/00; G01V 1/30; G01V 2210/50; G01V 2210/30; G01V 2210/626; G01V 2210/614; G06F 17/13; G06F 17/5009; G06F 17/10; G06F 2217/16

See application file for complete search history.

(56) References Cited

U.S. PATENT DOCUMENTS

| | | | |
|---|---|---|---|
| 4,159,463 A | 6/1979 | Silverman | |
| 4,168,485 A | 9/1979 | Payton et al. | |
| 4,434,383 A * | 2/1984 | Cho | H03H 9/02834 310/313 D |
| 4,545,039 A | 10/1985 | Savit | |
| 4,562,650 A | 1/1986 | Nagasawa et al. | |
| 4,575,830 A | 3/1986 | Ingram et al. | |
| 4,594,662 A | 6/1986 | Devaney | |
| 4,636,957 A | 1/1987 | Vannier et al. | |
| 4,675,851 A | 6/1987 | Savit et al. | |
| 4,686,654 A | 8/1987 | Savit | |
| 4,707,812 A | 11/1987 | Martinez | |
| 4,715,020 A | 12/1987 | Landrum, Jr. | |
| 4,766,574 A | 8/1988 | Whitmore et al. | |
| 4,780,856 A | 10/1988 | Becquey | |
| 4,823,326 A | 4/1989 | Ward | |
| 4,924,390 A | 5/1990 | Parsons et al. | |
| 4,953,657 A | 9/1990 | Edington | |
| 4,969,129 A | 11/1990 | Currie | |
| 4,982,374 A | 1/1991 | Edington et al. | |
| 5,260,911 A | 11/1993 | Mason et al. | |
| 5,469,062 A | 11/1995 | Meyer, Jr. | |
| 5,583,825 A | 12/1996 | Carrazzone et al. | |
| 5,677,893 A | 10/1997 | de Hoop et al. | |
| 5,715,213 A | 2/1998 | Allen | |
| 5,717,655 A | 2/1998 | Beasley | |
| 5,719,821 A | 2/1998 | Sallas et al. | |
| 5,721,710 A | 2/1998 | Sallas et al. | |
| 5,790,473 A | 8/1998 | Allen | |
| 5,798,982 A | 8/1998 | He et al. | |
| 5,822,269 A | 10/1998 | Allen | |
| 5,838,634 A | 11/1998 | Jones et al. | |
| 5,852,588 A | 12/1998 | de Hoop et al. | |
| 5,878,372 A | 3/1999 | Tabarovsky et al. | |
| 5,920,838 A | 7/1999 | Norris et al. | |
| 5,924,049 A | 7/1999 | Beasley et al. | |
| 5,999,488 A | 12/1999 | Smith | |
| 5,999,489 A | 12/1999 | Lazaratos | |
| 6,014,342 A | 1/2000 | Lazaratos | |
| 6,021,094 A | 2/2000 | Ober et al. | |
| 6,028,818 A | 2/2000 | Jeffryes | |
| 6,058,073 A | 5/2000 | VerWest | |
| 6,125,330 A | 9/2000 | Robertson et al. | |
| 6,219,621 B1 | 4/2001 | Hornbostel | |
| 6,225,803 B1 | 5/2001 | Chen | |
| 6,311,133 B1 | 10/2001 | Lailly et al. | |
| 6,317,695 B1 | 11/2001 | Zhou et al. | |
| 6,327,537 B1 | 12/2001 | Ikelle | |
| 6,374,201 B1 | 4/2002 | Grizon et al. | |
| 6,381,543 B1 | 4/2002 | Guerillot et al. | |
| 6,388,947 B1 | 5/2002 | Washbourne et al. | |
| 6,480,790 B1 | 11/2002 | Calvert et al. | |
| 6,522,973 B1 | 2/2003 | Tonellot et al. | |
| 6,545,944 B2 | 4/2003 | de Kok | |
| 6,549,854 B1 | 4/2003 | Malinverno et al. | |
| 6,574,564 B2 | 6/2003 | Lailly et al. | |
| 6,593,746 B2 | 7/2003 | Stolarczyk | |
| 6,662,147 B1 | 12/2003 | Fournier et al. | |
| 6,665,615 B2 | 12/2003 | Van Riel et al. | |
| 6,687,619 B2 | 2/2004 | Moerig et al. | |
| 6,687,659 B1 * | 2/2004 | Shen | G01V 1/28 367/73 |
| 6,704,245 B2 | 3/2004 | Becquey | |
| 6,714,867 B2 | 3/2004 | Meunier | |
| 6,735,527 B1 | 5/2004 | Levin | |
| 6,754,590 B1 | 6/2004 | Moldoveanu | |
| 6,766,256 B2 | 7/2004 | Jeffryes | |
| 6,826,486 B1 | 11/2004 | Malinverno | |
| 6,836,448 B2 | 12/2004 | Robertsson et al. | |
| 6,842,701 B2 | 1/2005 | Moerig et al. | |
| 6,859,734 B2 | 2/2005 | Bednar | |
| 6,865,487 B2 | 3/2005 | Charron | |
| 6,865,488 B2 | 3/2005 | Moerig et al. | |
| 6,876,928 B2 | 4/2005 | Van Riel et al. | |
| 6,882,938 B2 | 4/2005 | Vaage et al. | |
| 6,882,958 B2 | 4/2005 | Schmidt et al. | |
| 6,901,333 B2 | 5/2005 | Van Riel et al. | |
| 6,903,999 B2 | 6/2005 | Curtis et al. | |
| 6,905,916 B2 | 6/2005 | Bartsch et al. | |
| 6,906,981 B2 | 6/2005 | Vauge | |
| 6,927,698 B2 | 8/2005 | Stolarczyk | |
| 6,944,546 B2 | 9/2005 | Xiao et al. | |
| 6,947,843 B2 | 9/2005 | Fisher et al. | |
| 6,970,397 B2 | 11/2005 | Castagna et al. | |
| 6,977,866 B2 | 12/2005 | Huffman et al. | |
| 6,999,880 B2 | 2/2006 | Lee | |
| 7,046,581 B2 | 5/2006 | Calvert | |
| 7,050,356 B2 | 5/2006 | Jeffryes | |
| 7,069,149 B2 | 6/2006 | Goff et al. | |
| 7,027,927 B2 | 7/2006 | Routh et al. | |
| 7,072,767 B2 | 7/2006 | Routh et al. | |
| 7,092,823 B2 | 8/2006 | Lailly et al. | |
| 7,110,900 B2 | 9/2006 | Adler et al. | |
| 7,184,367 B2 | 2/2007 | Yin | |
| 7,230,879 B2 | 6/2007 | Herkenoff et al. | |
| 7,271,747 B2 | 9/2007 | Baraniuk et al. | |
| 7,330,799 B2 | 2/2008 | Lefebvre et al. | |
| 7,337,069 B2 | 2/2008 | Masson et al. | |
| 7,373,251 B2 | 5/2008 | Hamman et al. | |
| 7,373,252 B2 | 5/2008 | Sherrill et al. | |
| 7,376,046 B2 | 5/2008 | Jeffryes | |
| 7,376,539 B2 | 5/2008 | Lecomte | |
| 7,400,978 B2 | 7/2008 | Langlais et al. | |
| 7,436,734 B2 | 10/2008 | Krohn | |
| 7,480,206 B2 | 1/2009 | Hill | |
| 7,584,056 B2 | 9/2009 | Koren | |
| 7,599,798 B2 | 10/2009 | Beasley et al. | |
| 7,602,670 B2 | 10/2009 | Jeffryes | |
| 7,616,523 B1 | 11/2009 | Tabti et al. | |
| 7,620,534 B2 | 11/2009 | Pita et al. | |
| 7,620,536 B2 | 11/2009 | Chow | |
| 7,646,924 B2 | 1/2010 | Donoho | |
| 7,672,194 B2 | 3/2010 | Jeffryes | |
| 7,672,824 B2 | 3/2010 | Dutta et al. | |
| 7,675,815 B2 | 3/2010 | Saenger et al. | |
| 7,679,990 B2 | 3/2010 | Herkenhoff et al. | |
| 7,684,281 B2 | 3/2010 | Vaage et al. | |
| 7,710,821 B2 | 5/2010 | Robertsson et al. | |
| 7,715,985 B2 | 5/2010 | Van Manen et al. | |
| 7,715,986 B2 | 5/2010 | Nemeth et al. | |
| 7,725,266 B2 | 5/2010 | Sirgue et al. | |
| 7,791,980 B2 | 9/2010 | Robertsson et al. | |
| 7,835,072 B2 | 11/2010 | Izumi | |
| 7,840,625 B2 | 11/2010 | Candes et al. | |
| 7,940,601 B2 | 5/2011 | Ghosh | |
| 8,121,823 B2 | 2/2012 | Krebs et al. | |

(56) References Cited

U.S. PATENT DOCUMENTS

| | | | |
|---|---|---|---|
| 8,223,587 B2* | 7/2012 | Krebs | G01V 1/282 367/43 |
| 8,248,886 B2 | 8/2012 | Neelamani et al. | |
| 8,428,925 B2 | 4/2013 | Krebs et al. | |
| 8,437,998 B2 | 5/2013 | Routh et al. | |
| 8,547,794 B2 | 10/2013 | Gulati et al. | |
| 8,688,381 B2 | 4/2014 | Routh et al. | |
| 8,694,299 B2* | 4/2014 | Krebs | G01V 11/00 702/11 |
| 8,756,042 B2* | 6/2014 | Tan | G01V 1/282 703/10 |
| 8,781,748 B2 | 7/2014 | Laddoch et al. | |
| 8,965,059 B2* | 2/2015 | Winbow | G01V 1/282 382/109 |
| 9,910,189 B2* | 3/2018 | Dickens | G06F 17/12 |
| 10,089,423 B2* | 10/2018 | Qiang | G06F 17/5009 |
| 10,185,046 B2* | 1/2019 | Anderson | G01V 1/36 |
| 10,241,222 B2* | 3/2019 | Jiang | G01V 1/282 |
| 2002/0099504 A1 | 7/2002 | Cross et al. | |
| 2002/0120429 A1 | 8/2002 | Ortoleva | |
| 2002/0183980 A1 | 12/2002 | Guillaume | |
| 2004/0199330 A1 | 10/2004 | Routh et al. | |
| 2004/0225438 A1 | 11/2004 | Okoniewski et al. | |
| 2006/0235666 A1 | 10/2006 | Assa et al. | |
| 2006/0255809 A1* | 11/2006 | Johnstad | G01V 3/30 324/337 |
| 2007/0036030 A1 | 2/2007 | Baumel et al. | |
| 2007/0038691 A1 | 2/2007 | Candes et al. | |
| 2007/0274155 A1 | 11/2007 | Ikelle | |
| 2008/0175101 A1 | 7/2008 | Saenger et al. | |
| 2008/0306692 A1 | 12/2008 | Singer et al. | |
| 2009/0006054 A1 | 1/2009 | Song | |
| 2009/0067041 A1 | 3/2009 | Krauklis et al. | |
| 2009/0070042 A1 | 3/2009 | Birchwood et al. | |
| 2009/0083006 A1 | 3/2009 | Mackie | |
| 2009/0164186 A1 | 6/2009 | Haase et al. | |
| 2009/0164756 A1 | 6/2009 | Dokken et al. | |
| 2009/0187391 A1 | 7/2009 | Wendt et al. | |
| 2009/0248308 A1 | 10/2009 | Luling | |
| 2009/0254320 A1 | 10/2009 | Lovatini et al. | |
| 2009/0259406 A1 | 10/2009 | Khadhraoui et al. | |
| 2010/0008184 A1 | 1/2010 | Hegna et al. | |
| 2010/0018718 A1 | 1/2010 | Krebs et al. | |
| 2010/0039894 A1 | 2/2010 | Abma et al. | |
| 2010/0054082 A1 | 3/2010 | McGarry et al. | |
| 2010/0088035 A1 | 4/2010 | Etgen et al. | |
| 2010/0103772 A1 | 4/2010 | Eick et al. | |
| 2010/0110417 A1* | 5/2010 | Xu | G02B 6/12007 356/73.1 |
| 2010/0118651 A1 | 5/2010 | Liu et al. | |
| 2010/0142316 A1 | 6/2010 | Keers et al. | |
| 2010/0161233 A1 | 6/2010 | Saenger et al. | |
| 2010/0161234 A1 | 6/2010 | Saenger et al. | |
| 2010/0185422 A1 | 7/2010 | Hoversten | |
| 2010/0208554 A1 | 8/2010 | Chiu et al. | |
| 2010/0212902 A1 | 8/2010 | Baumstein et al. | |
| 2010/0246324 A1 | 9/2010 | Dragoset, Jr. et al. | |
| 2010/0265797 A1 | 10/2010 | Robertsson et al. | |
| 2010/0270026 A1 | 10/2010 | Lazaratos et al. | |
| 2010/0286919 A1 | 11/2010 | Lee et al. | |
| 2010/0299070 A1 | 11/2010 | Abma | |
| 2011/0000678 A1 | 1/2011 | Krebs et al. | |
| 2011/0040926 A1 | 2/2011 | Donderici et al. | |
| 2011/0051553 A1 | 3/2011 | Scott et al. | |
| 2011/0090760 A1 | 4/2011 | Rickett et al. | |
| 2011/0131020 A1 | 6/2011 | Meng | |
| 2011/0134722 A1 | 6/2011 | Virgilio et al. | |
| 2011/0182141 A1 | 7/2011 | Zhamikov et al. | |
| 2011/0182144 A1 | 7/2011 | Gray | |
| 2011/0191032 A1 | 8/2011 | Moore | |
| 2011/0194379 A1 | 8/2011 | Lee et al. | |
| 2011/0222370 A1 | 9/2011 | Downton et al. | |
| 2011/0227577 A1 | 9/2011 | Zhang et al. | |
| 2011/0235464 A1 | 9/2011 | Brittan et al. | |
| 2011/0238390 A1 | 9/2011 | Krebs et al. | |
| 2011/0246140 A1 | 10/2011 | Abubakar et al. | |
| 2011/0267921 A1 | 11/2011 | Mortel et al. | |
| 2011/0267923 A1 | 11/2011 | Shin | |
| 2011/0276320 A1 | 11/2011 | Krebs et al. | |
| 2011/0288831 A1* | 11/2011 | Tan | G01V 1/282 703/2 |
| 2011/0299361 A1 | 12/2011 | Shin | |
| 2011/0320180 A1 | 12/2011 | Al-Saleh | |
| 2012/0010862 A1 | 1/2012 | Costen | |
| 2012/0014215 A1 | 1/2012 | Saenger et al. | |
| 2012/0014216 A1 | 1/2012 | Saenger et al. | |
| 2012/0051176 A1 | 3/2012 | Liu | |
| 2012/0073824 A1 | 3/2012 | Routh | |
| 2012/0073825 A1 | 3/2012 | Routh | |
| 2012/0082344 A1 | 4/2012 | Donoho | |
| 2012/0143506 A1 | 6/2012 | Routh et al. | |
| 2012/0215506 A1 | 8/2012 | Rickett et al. | |
| 2012/0218859 A1 | 8/2012 | Soubaras | |
| 2012/0236686 A1* | 9/2012 | Shin | G01V 1/30 367/73 |
| 2012/0275264 A1 | 11/2012 | Kostov et al. | |
| 2012/0275267 A1 | 11/2012 | Neelamani et al. | |
| 2012/0290214 A1 | 11/2012 | Huo et al. | |
| 2012/0314538 A1 | 12/2012 | Washbourne et al. | |
| 2012/0316790 A1 | 12/2012 | Washbourne et al. | |
| 2012/0316844 A1 | 12/2012 | Shah et al. | |
| 2013/0003500 A1* | 1/2013 | Neelamani | G01V 1/28 367/73 |
| 2013/0060539 A1 | 3/2013 | Baumstein | |
| 2013/0060544 A1* | 3/2013 | Bakker | G01V 1/28 703/2 |
| 2013/0064431 A1* | 3/2013 | Winbow | G01V 1/282 382/109 |
| 2013/0081752 A1 | 4/2013 | Kurimura et al. | |
| 2013/0182538 A1* | 7/2013 | Lin | G01V 1/282 367/53 |
| 2013/0238246 A1 | 9/2013 | Krebs et al. | |
| 2013/0279290 A1 | 10/2013 | Poole | |
| 2013/0282292 A1 | 10/2013 | Wang et al. | |
| 2013/0311149 A1 | 11/2013 | Tang | |
| 2013/0311151 A1 | 11/2013 | Plessix | |
| 2014/0207426 A1* | 7/2014 | Shin | G06F 17/5009 703/2 |
| 2014/0350861 A1 | 11/2014 | Wang et al. | |
| 2014/0358504 A1 | 12/2014 | Baumstein et al. | |
| 2014/0372043 A1* | 12/2014 | Hu | G01V 1/303 702/16 |
| 2015/0272506 A1* | 10/2015 | Childs | A61B 8/5207 702/189 |
| 2016/0223697 A1* | 8/2016 | Vdovina | G01V 1/282 |
| 2016/0238723 A1* | 8/2016 | Brytik | G01V 1/282 |
| 2017/0206288 A1* | 7/2017 | Gordon | G06F 17/5009 |
| 2017/0336522 A1* | 11/2017 | Jiang | G01V 1/282 |

FOREIGN PATENT DOCUMENTS

| | | | |
|---|---|---|---|
| EP | 1 746 443 | | 1/2007 |
| GB | 2 390 712 | | 1/2004 |
| GB | 2 391 665 | | 2/2004 |
| WO | WO 2006/037815 | | 4/2006 |
| WO | WO 2007/046711 | | 4/2007 |
| WO | WO 2008/042081 | | 4/2008 |
| WO | WO 2008/123920 | | 10/2008 |
| WO | WO 2009/067041 | | 5/2009 |
| WO | WO 2009/117174 | | 9/2009 |
| WO | WO 2010/085822 | | 7/2010 |
| WO | WO 2011/040926 | | 4/2011 |
| WO | WO 2011/091216 | | 7/2011 |
| WO | WO 2011/093945 | | 8/2011 |
| WO | WO 2012/024025 | | 2/2012 |
| WO | WO 2012/041834 | | 4/2012 |
| WO | WO 2012/083234 | | 6/2012 |
| WO | WO 2012/134621 | | 10/2012 |
| WO | WO 2012/170201 | | 12/2012 |
| WO | WO 2013/081752 | | 6/2013 |
| WO | WO 2016108896 | * | 7/2016 ............... G01V 1/28 |

(56) References Cited

FOREIGN PATENT DOCUMENTS

OTHER PUBLICATIONS

Tarantola, A. (1986), "A strategy for nonlinear elastic inversion of seismic reflection data," *Geophysics* 51(10), pp. 1893-1903.
Tarantola, A. (1988), "Theoretical background for the inversion of seismic waveforms, including elasticity and attenuation," *Pure and Applied Geophysics* 128, pp. 365-399.
Tarantola, A. (2005), "Inverse Problem Theory and Methods for Model Parameter Estimation," *SIAM*, pp. 79.
Tarantola, A. (1984), "Inversion of seismic reflection data in the acoustic approximation," *Geophysics* 49, pp. 1259-1266.
Trantham, E.C. (1994), "Controlled-phase acquisition and processing," *SEG Expanded Abstracts* 13, pp. 890-894.
Tsvankin, I. (2001), "Seismic Signatures and Analysis of Reflection Data in Anisotropic Media," Elsevier Science, p. 8.
Valenciano, A.A. (2008), "Imaging by Wave-Equation Inversion," A Dissertation, Stanford University, 138 pgs.
Van Groenestijn, G.J.A. et al. (2009), "Estimating primaries by sparse inversion and application to near-offset reconstruction," *Geophyhsics* 74(3), pp. A23-A28.
Van Manen, D.J. (2005), "Making wave by time reversal," SEG International Exposition and 75$^{th}$ Annual Meeting, *Expanded Abstracts*, pp. 1763-1766.
Verschuur, D.J. (2009), Target-oriented, least-squares imaging of blended data, 79th Annual Int'l. Meeting, *SEG Expanded Abstracts*, pp. 2889-2893.
Verschuur, D.J. et al. (1992), "Adaptive surface-related multiple elimination," *Geophysics* 57(9), pp. 1166-1177.
Verschuur, D.J. (1989), "Wavelet Estimation by Prestack Multiple Elimination," *SEG Expanded Abstracts* 8, pp. 1129-1132.
Versteeg, R. (1994), "The Marmousi experience: Velocity model determination on a synthetic complex data set," *The Leading Edge*, pp. 927-936.
Vigh, D. et al. (2008), "3D prestack plane-wave, full-waveform inversion," *Geophysics* 73(5), pp. VE135-VE144.
Wang, Y. (2007), "Multiple prediction through inversion: Theoretical advancements and real data application," Geophysics 72(2), pp. V33-V39.
Wang, K. et al. (2009), "Simultaneous full-waveform inversion for source wavelet and earth model," SEG Int'l. Expo. & Ann. Meeting, Expanded Abstracts, pp. 2537-2541.
Weglein, A.B. (2003), "Inverse scattering series and seismic exploration," *Inverse Problems* 19, pp. R27-R83.
Wong, M. et al. (2010), "Joint least-squares inversion of up- and down-going signal for ocean bottom data sets," *SEG Expanded Abstracts* 29, pp. 2752-2756.
Wu R-S. et al. (2006), "Directional illumination analysis using beamlet decomposition and propagation," *Geophysics* 71(4), pp. S147-S159.
Xia, J. et al. (2004), "Utilization of high-frequency Rayleigh waves in near-surface geophysics," *The Leading Edge*, pp. 753-759.
Xie, X. et al. (2002), "Extracting angle domain information from migrated wavefield," *SEG Expanded Abstracts*21, pp. 1360-1363.
Xie, X.-B. et al. (2006), "Wave-equation-based seismic illumination analysis," *Geophysics* 71(5), pp. S169-S177.
Yang, K. et al. (2000), "Quasi-Orthogonal Sequences for Code-Division Multiple-Access Systems," *IEEE Transactions on Information Theory* 46(3), pp. 982-993.
Yoon, K. et al. (2004), "Challenges in reverse-time migration," *SEG Expanded Abstracts* 23, pp. 1057-1060.
Young, J. et al. (2011), "An application of random projection to parameter estimation in partial differential equations," SIAM, 20 pgs.
Zhang, Y. (2005), "Delayed-shot 3D depth migration," *Geophysics* 70, pp. E21-E28.
Ziolkowski, A. (1991), "Why don't we measure seismic signatures?," *Geophysics* 56(2), pp. 190-201.
U.S. Appl. No. 14/329,431, filed Jul. 11, 2014, Krohn et al.
U.S. Appl. No. 14/330,767, filed Jul. 14, 2014, Tang et al.

Berenger, J., "A Perfectly Matched Layer for the Absorption of Electromagnetic Waves," *Journal of Computational Physics* 114, pp. 185-200, 1994.
Marcinkovich, C. et al., "On the implementation of perfectly matched layers in a three-dimensional fourth-order velocity-stress finite difference scheme," *Journal of Geophysical Research* 108(65), pp. 18-1-18-16, May 27, 2003.
Mora, P. (1987), "Elastic Wavefield Inversion," PhD Thesis, Stanford University, pp. 22-25.
Mora, P. (1989), "Inversion = migration + tomography," *Geophysics* 64, pp. 888-901.
Nazarian, S. et al. (1983), "Use of spectral analysis of surface waves method for determination of moduli and thickness of pavement systems," *Transport Res. Record* 930, pp. 38-45.
Neelamani, R., (2008), "Simultaneous sourcing without compromise," 70th Annual Int'l. Conf. and Exh., EAGE, 5 pgs.
Neelamani, R. (2009), "Efficient seismic forward modeling using simultaneous sources and sparsity," *SEG Expanded Abstracts*, pp. 2107-2111.
Nocedal, J. et al. (2006), "*Numerical Optimization, Chapt. 7—Large-Scale Unconstrained Optimization*," Springer, New York, 2$^{nd}$ Edition, pp. 165-176.
Nocedal, J. et al. (2000), "Numerical Optimization-Calculating Derivatives," Chapter 8, Springer Verlag, pp. 194-199.
Ostmo, S. et al. (2002), "Finite-difference iterative migration by linearized waveform inversion in the frequency domain," SEG Int'l. Expo. & 72$^{nd}$ Ann. Meeting, 4 pgs.
Park, C.B. et al. (1999), "Multichannel analysis of surface waves," *Geophysics* 64(3), pp. 800-808.
Park, C.B. et al. (2007), "Multichannel analysis of surface waves (MASW)—active and passive methods," *The Leading Edge*, pp. 60-64.
Pica, A. et al. (2005), "3D Surface-Related Multiple Modeling, Principles and Results," 2005 SEG Ann. Meeting, *SEG Expanded Abstracts* 24, pp. 2080-2083.
Plessix, R.E. et al. (2004), "Frequency-domain finite-difference amplitude preserving migration," *Geophys. J. Int.* 157, pp. 975-987.
Porter, R.P. (1989), "Generalized holography with application to inverse scattering and inverse source problems," In E. Wolf, editor, *Progress in Optics* XXVII, Elsevier, pp. 317-397.
Pratt, R.G. et al. (1998), "Gauss-Newton and full Newton methods in frequency-space seismic waveform inversion," *Geophys. J. Int.* 133, pp. 341-362.
Pratt, R.G. (1999), "Seismic waveform inversion in the frequency domain, Part 1: Theory and verification in a physical scale model," *Geophysics* 64, pp. 888-901.
Rawlinson, N. et al. (2008), "A dynamic objective function technique for generating multiple solution models in seismic tomography," *Geophys. J. Int.* 178, pp. 295-308.
Rayleigh, J.W.S. (1899), "On the transmission of light through an atmosphere containing small particles in suspension, and on the origin of the blue of the sky," Phil. Mag. 47, pp. 375-384.
Romero, L.A. et al. (2000), Phase encoding of shot records in prestack migration, *Geophysics* 65, pp. 426-436.
Ronen S. et al. (2005), "Imaging Downgoing waves from Ocean Bottom Stations," *SEG Expanded Abstracts*, pp. 963-967.
Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.
Ryden, N. et al. (2006), "Fast simulated annealing inversion of surface waves on pavement using phase-velocity spectra," *Geophysics* 71(4), pp. R49-R58.
Sambridge, M.S. et al. (1991), "An Alternative Strategy for Non-Linear Inversion of Seismic Waveforms," *Geophysical Prospecting* 39, pp. 723-736.
Schoenberg, M. et al. (1989), "A calculus for finely layered anisotropic media," *Geophysics* 54, pp. 581-589.
Schuster, G.T. et al. (2010), "Theory of Multisource Crosstalk Reduction by Phase-Encoded Statics," SEG Denver 2010 Ann. Meeting, pp. 3110-3114.
Sears, T.J. et al. (2008), "Elastic full waveform inversion of multicomponent OBC seismic data," *Geophysical Prospecting* 56, pp. 843-862.

(56) References Cited

OTHER PUBLICATIONS

Sheen, D-H. et al. (2006), "Time domain Gauss-Newton seismic waveform inversion in elastic media," Geophysics J. Int. 167, pp. 1373-1384.
Shen, P. et al. (2003), "Differential semblance velocity analysis by wave-equation migration," 73$^{rd}$ Ann. Meeting of Society of Exploration Geophysicists, 4 pgs.
Sheng, J. et al. (2006), "Early arrival waveform tomography on near-surface refraction data," Geophysics 71, pp. U47-U57.
Sheriff, R.E.et al. (1982), "*Exploration Seismology*", pp. 134-135.
Shih, R-C. et al. (1996), "Iterative pre-stack depth migration with velocity analysis," Terrestrial, Atmospheric & Oceanic Sciences 7(2), pp. 149-158.
Shin, C. et al. (2001), "Waveform inversion using a logarithmic wavefieid," Geophysics 49, pp. 592-606.
Simard, P.Y. et al. (1990), "Vector Field Restoration by the Method of Convex Projections," Computer Vision, Graphics and Image Processing 52, pp. 360-385.
Sirgue, L. (2004), "Efficient waveform inversion and imaging: A strategy for selecting temporal frequencies," Geophysics 69, pp. 231-248.
Soubaras, R. et al. (2007), "Velocity model building by semblance maximization of modulated-shot gathers," Geophysics 72(5), pp. U67-U73.
Spitz, S. (2008), "Simultaneous source separation: a prediction-subtraction approach," 78th Annual Int'l. Meeting, SEG Expanded Abstracts, pp. 2811-2815.
Stefani, J. (2007), "Acquisition using simultaneous sources," 69th Annual Conf. and Exh., EAGE Extended Abstracts, 5 pgs.
Symes, W.W. (2007), "Reverse time migration with optimal checkpointing," Geophysics 72(5), pp. P.SM213-P.SM221.
Symes, W.W. (2009), "Interface error analysis for numerical wave propagation," Compu. Geosci. 13, pp. 363-371.
Tang, Y. (2008), "Wave-equation Hessian by phase encoding," SEG Expanded Abstracts 27, pp. 2201-2205.
Tang, Y. (2009), "Target-oriented wave-equation least-squares migration/inversion with phase-encoded Hessian," Geophysics 74, pp. WCA95-WCA107.
Tang, Y. et al. (2010), "Preconditioning full waveform inversion with phase-encoded Hessian," SEG Expanded Abstracts 29, pp. 1034-1037.
Abt, D.L. et al. (2010), "North American lithospheric discontinuity structured imaged by Ps and Sp receiver functions", J. Geophys. Res., 24 pgs.
Akerberg, P., et al. (2008), "Simultaneous source separation by sparse radon transform," 78th SEG Annual International Meeting, Expanded Abstracts, pp. 2801-2805.
Aki, K. et al. (1980), "Quantitative Seismology: Theory and Methods vol. I—Chapter 7—Surface Waves in a Vertically Heterogenous Medium," W.H. Freeman and Co., pp. 259-318.
Aki, K. et al. (1980), "Quantitative Seismology: Theory and Methods vol. I," W.H. Freeman and Co., p. 173.
Aki et al. (1980), "Quantitative Seismology, Theory and Methods," Chapter 5.20, W.H. Freeman & Co., pp. 133-155.
Amundsen, L. (2001), "Elimination of free-surface related multiples without need of the source wavelet," Geophysics 60(1), pp. 327-341.
Anderson, J.E. et al. (2008), "Sources Near the Free-Surface Boundary: Pitfalls for Elastic Finite-Difference Seismic Simulation and Multi-Grid Waveform Inversion," 70$^{th}$ EAGE Conf. & Exh., 4 pgs.
Barr, F.J. et al. (1989), "Attenuation of Water-Column Reverberations Using Pressure and Velocity Detectors in a Water-Bottom Cable," 59$^{th}$ Annual SEG meeting, Expanded Abstracts, pp. 653-656.
Baumstein, A. et al. (2009), "Scaling of the Objective Function Gradient for Full Wavefield Inversion," SEG Houston 2009 Int'l. Expo and Annual Meeting, pp. 224-2247.
Beasley, C. (2008), "A new look at marine simultaneous sources," The Leading Edge 27(7), pp. 914-917.

Beasley, C. (2012), "A 3D simultaneous source field test processed using alternating projections: a new active separation method," Geophsyical Prospecting 60, pp. 591-601.
Beaty, K.S. et al. (2003), "Repeatability of multimode Rayleigh-wave dispersion studies," Geophysics 68(3), pp. 782-790.
Beaty, K.S. et al. (2002), "Simulated annealing inversion of multimode Rayleigh wave dispersion waves for geological structure," Geophys. J. Int. 151, pp. 622-631.
Becquey, M. et al. (2002), "Pseudo-Random Coded Simultaneous Vibroseismics," SEG Int'l. Exposition and 72th Annl. Mtg., 4 pgs.
Ben-Hadj-Ali, H. et al. (2009), "Three-dimensional frequency-domain full waveform inversion with phase encoding," SEG Expanded Abstracts, pp. 2288-2292.
Ben-Hadj-Ali, H. et al. (2011), "An efficient frequency-domain full waveform inversion method using simultaneous encoded sources," Geophysics 76(4), pp. R109-R124.
Benitez, D. et al. (2001), "The use of the Hilbert transform in ECG signal analysis," Computers in Biology and Medicine 31, pp. 399-406.
Berenger, J-P. (1994), "A Perfectly Matched Layer for the Absorption of Electromagnetic Waves," J. of Computational Physics 114, pp. 185-200.
Berkhout, A.J. (1987), "Applied Seismic Wave Theory," Elsevier Science Publishers, p. 142.
Berkhout, A.J. (1992), "Areal shot record technology," Journal of Seismic Exploration 1, pp. 251-264.
Berkhout, A.J. (2008), "Changing the mindset in seismic data acquisition," The Leading Edge 27(7), pp. 924-938.
Beylkin, G. (1985), "Imaging of discontinuities in the inverse scattring problem by inversion of a causal generalized Radon transform," J. Math. Phys. 26, pp. 99-108.
Biondi, B. (1992), "Velocity estimation by beam stack," Geophysics 57(8), pp. 1034-1047.
Bonomi, E. et al. (2006), "Wavefield Migration plus Monte Carlo Imaging of 3D Prestack Seismic Data," Geophysical Prospecting 54, pp. 505-514.
Boonyasiriwat, C. et al. (2010), 3D Multisource Full-Waveform using Dynamic Random Phase Encoding, SEG Denver 2010 Annual Meeting, pp. 1044-1049.
Boonyasiriwat, C. et al. (2010), 3D Multisource Full-Waveform using Dynamic Random Phase Encoding, SEG Denver 2010 Annual Meeting, pp. 3120-3124.
Bunks, C., et al. (1995), "Multiscale seismic waveform inversion," Geophysics 60, pp. 1457-1473.
Burstedde, G. et al. (2009), "Algorithmic strategies for full waveform inversion: 1D experiments," Geophysics 74(6), pp. WCC17-WCC46.
Chavent, G. et al. (1999), "An optimal true-amplitude least-squares prestack depth-migration operator," Geophysics 64(2), pp. 508-515.
Choi, Y. et al. (2011), "Application of encoded multisource waveform inversion to marine-streamer acquisition based on the global correlation," 73$^{rd}$ EAGE Conference, Abstract, pp. F026.
Choi, Y et al. (2012), "Application of multi-source waveform inversion to marine stream data using the global correlation norm," Geophysical Prospecting 60, pp. 748-758.
Clapp, R.G. (2009), "Reverse time migration with random boundaries," SEG International Exposition and Meeting, Expanded Abstracts, pp. 2809-2813.
Dai, W. et al. (2010), "3D Multi-source Least-squares Reverse Time Migration," SEG Denver 2010 Annual Meeting, pp. 3120-3124.
Delprat-Jannuad, F. et al. (2005), "A fundamental limitation for the reconstruction of impedance profiles from seismic data," Geophysics 70(1), pp. R1-R14.
Dickens, T.A. et al. (2011), RTM angle gathers using Poynting vectors, SEG Expanded Abstracts 30, pp. 3109-3113.
Donerici, B. et al. (1005), "Improved FDTD Subgridding Algorithms Via Digital Filtering and Domain Overriding," IEEE Transactions on Antennas and Propagation 53(9), pp. 2938-2951.
Downey, N. et al. (2011), "Random-Beam Full-Wavefield Inversion," 2011 San Antonio Annual Meeting, pp. 2423-2427.
Dunkin, J.W. et al. (1973), "Effect of Normal Moveout on a Seismic Pluse," Geophysics 38(4), pp. 635-642.

(56) References Cited

OTHER PUBLICATIONS

Dziewonski A. et al. (1981), "Preliminary Reference Earth Model", *Phys. Earth Planet. Int.* 25(4), pp. 297-356.
Ernst, F.E. et al. (2000), "Tomography of dispersive media," *J. Acoust. Soc. Am* 108(1), pp. 105-116.
Ernst, F.E. et al. (2002), "Removal of scattered guided waves from seismic data," *Geophysics* 67(4), pp. 1240-1248.
Esmersoy, C. (1990), "Inversion of P and SV waves from multicomponent offset vertical seismic profiles", *Geophysics* 55(1), pp. 39-50.
Etgen, J.T. et al. (2007), "Computational methods for large-scale 3D acoustic finite-difference modeling: A tutorial," *Geophysics* 72(5), pp. SM223-SM230.
Fallat, M.R. et al. (1999), "Geoacoustic inversion via local, global, and hybrid algorithms," *Journal of the Acoustical Society of America* 105, pp. 3219-3230.
Fichtner, A. et al. (2006), "The adjoint method in seismology I. Theory," *Physics of the Earth and Planetary Interiors* 157, pp. 86-104.
Forbriger, T. (2003), "Inversion of shallow-seismic wavefields: I. Wavefield transformation," *Geophys. J. Int.* 153, pp. 719-734.
Gao, H. et al. (2008), "Implementation of perfectly matched layers in an arbitrary geometrical boundary for leastic wave modeling," *Geophysics J. Int.* 174, pp. 1029-1036.
Gibson, B. et al. (1984), "Predictive deconvolution and the zero-phase source," *Geophysics* 49(4), pp. 379-397.
Godfrey, R. J. et al. (1998), "Imaging the Foiaven Ghost," *SEG Expanded Abstracts*, 4 pgs.
Griewank, A. (1992), "Achieving logarithmic growth of temporal and spatial complexity in reverse automatic differentiation," 1 *Optimization Methods and Software*, pp. 35-54.
Griewank, A. (2000), Evaluating Derivatives: Principles and Techniques of Algorithmic Differentiation, Society for Industrial and Applied Mathematics, 49 pgs.
Griewank, A. et al. (2000), "Algorithm 799: An implementation of checkpointing for the reverse or adjoint mode of computational differentiation," 26 *ACM Transactions on Mathematical Software*, pp. 19-45.
Griewank, A. et al. (1996), "Algorithm 755: A package for the automatic differentiation of algorithms written in C/C++," *ACM Transactions on Mathematical Software* 22(2), pp. 131-167.
Haber, E. et al. (2010), "An effective method for parameter estimation with PDE constraints with multiple right hand sides," Preprint—UBC http://www.math.ubc.ca/~haber/pubs/PdeOptStochV5.pdf.
Hampson, D.P. et al. (2005), "Simultaneous inversion of pre-stack seismic data," SEG 75$^{th}$ Annual Int'l. Meeting, *Expanded Abstracts*, pp. 1633-1637.
Heinkenschloss, M. (2008), :"Numerical Solution of Implicity Constrained Optimization Problems," CAAM Technical Report TR08-05, 25 pgs.
Helbig, K. (1994), "Foundations of Anisotropy for Exploration Seismics," Chapter 5, pp. 185-194.
Herrmann, F.J. (2010), "Randomized dimensionality reduction for full-waveform inversion," *EAGE abstract* G001, EAGE Barcelona meeting, 5 pgs.
Holschneider, J. et al. (2005), "Characterization of dispersive surface waves using continuous wavelet transforms," *Geophys. J. Int.* 163, pp. 463-478.
Hu, L.Z. et al. (1987), "Wave-field transformations of vertical seismic profiles," *Geophysics* 52, pp. 307-321.
Huang, Y. et al. (2012), "Multisource least-squares migration of marine streamer and land data with frequency-division encoding," *Geophysical Prospecting* 60, pp. 663-680.
Igel, H. et al. (1996), "Waveform inversion of marine reflection seismograms for P impedance and Poisson's ratio," *Geophys. J. Int.* 124, pp. 363-371.
Ikelle, L.T. (2007), "Coding and decoding: Seismic data modeling, acquisition, and processing," 77th Annual Int'l. Meeting, SEG Expanded Abstracts, pp. 66-70.
Jackson, D.R. et al. (1991), "Phase conjugation in underwater acoustics," *J. Acoust. Soc. Am.* 89(1), pp. 171-181.
Jing, X. et al. (2000), "Encoding multiple shot gathers in prestack migration," *SEG International Exposition and 70$^{th}$ Annual Meeting Expanded Abstracts*, pp. 786-789.
Kennett, B.L.N. (1991), "The removal of free surface interactions from three-component seismograms", *Geophys. J. Int.* 104, pp. 153-163.
Kennett, B.L.N. et al. (1988), "Subspace methods for large inverse problems with multiple parameter classes," *Geophysical J.* 94, pp. 237-247.
Krebs, J.R. (2008), "Fast Full-wavefield seismic inversion using encoded sources," *Geophysics* 74(6), pp. WCC177-WCC188.
Krohn, C.E. (1984), "Geophone ground coupling," *Geophysics* 49(6), pp. 722-731.
Kroode, F.T. et al. (2009), "Wave Equation Based Model Building and Imaging in Complex Settings," OTC 20215, 2009 Offshore Technology Conf., Houston, TX, May 4-7, 2009, 8 pgs.
Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.
Lancaster, S. et al. (2000), "Fast-track 'colored' inversion," 70$^{th}$ SEG Ann. Meeting, *Expanded Abstracts*, pp. 1572-1575.
Lazaratos, S. et al. (2009), "Inversion of Pre-migration Spectral Shaping," 2009 SEG Houston Int'l. Expo. & Ann. Meeting, *Expanded Abstracts*, pp. 2383-2387.
Lazaratos, S. (2006), "Spectral Shaping Inversion for Elastic and Rock Property Estimation," *Research Disclosure*, Issue 511, pp. 1453-1459.
Lazaratos, S. et al. (2011), "Improving the convergence rate of full wavefield inversion using spectral shaping," *SEG Expanded Abstracts* 30, pp. 2428-2432.
Lecomte, I. (2008), "Resolution and illumination analyses in PSDM: A ray-based approach," The Leading Edge, pp. 650-663.
Lee, S. et al. (2010), "Subsurface parameter estimation in full wavefield inversion and reverse time migration," SEG Denver 2010 Annual Meeting, pp. 1065-1069.
Levanon, N. (1988), "Radar Principles," Chpt. 1, John Whitey & Sons, New York, pp. 1-18.
Liao, Q. et al. (1995), "2.5D full-wavefield viscoacoustic inversion," *Geophysical Prospecting* 43, pp. 1043-1059.
Liu, F. et al. (2007), "Reverse-time migration using one-way wavefield imaging condition," *SEG Expanded Abstracts* 26, pp. 2170-2174.
Liu, F. et al. (2011), "An effective imaging condition for reverse-time migration using wavefield decomposition," *Geophysics* 76, pp. S29-S39.
Maharramov, M. et al. (2007) , "Localized image-difference wave-equation tomography," SEG Annual Meeting, *Expanded Abstracts*, pp. 3009-3013.
Malmedy, V. et al. (2009), "Approximating Hessians in unconstrained optimization arising from discretized problems," *Computational Optimization and Applications*, pp. 1-16.
Martin, G.S. et al. (2006), "Marmousi2: An elastic upgrade for Marmousi," *The Leading Edge*, pp. 156-166.
Meier, M.A. et al. (2009), "Converted wave resolution," Geophysics, 74(2):doi:10.1190/1.3074303, pp. Q1-Q16.
Moghaddam, P.P. et al. (2010), "Randomized full-waveform inversion: a dimenstionality-reduction approach," 80$^{th}$ SEG Ann. Meeting, *Expanded Abstracts*, pp. 977-982.
Mora, P. (1987), "Nonlinear two-dimensional elastic inversion of multi-offset seismic data," *Geophysics* 52, pp. 1211-1228.
Haber, E. et al. (2010), "An effective method for parameter estimation with PDE constraints with multiple right hand sides," Preprint—UBC http://www.math.ubc.caf~haber/pubs/PdeOptStochV5.pdf.
Levanon, N. (1988), "Radar Principles," Chpt. 1, John Whiley & Sons, New York, pp. 1-18.

\* cited by examiner

POYNTING VECTOR MINIMAL REFLECTION BOUNDARY CONDITIONS

CROSS-REFERENCE TO RELATED APPLICATION

This application claims the benefit of U.S. Provisional Patent Application 62/111,956 filed Feb. 4, 2015, entitled POYNTING VECTOR MINIMAL REFLECTION BOUNDARY CONDITIONS, the entirety of which is incorporated by reference herein.

FIELD OF THE INVENTION

Exemplary embodiments described herein generally relate to the field of geophysical prospecting for hydrocarbons and, more particularly, to seismic data processing. Specifically, the exemplary embodiments relate to the technical fields of seismic simulation, reverse time depth migration, and full waveform inversion.

BACKGROUND

This section is intended to introduce various aspects of the art, which may be associated with exemplary embodiments of the present technological advancement. This discussion is believed to assist in providing a framework to facilitate a better understanding of particular aspects of the present technological advancement. Accordingly, it should be understood that this section should be read in this light, and not necessarily as admissions of prior art.

The perfectly matched layers (PML) absorbing boundary condition by Berenger (1994) is commonly used to approximate the radiation boundary condition for the sides and bottom of an earth model where the earth model is assumed to have infinite extent but the computational model has finite extent. Waves should not reflect from external boundaries of the computational model that are designated to have the radiation boundary condition.

In the standard form for PML as described by Marcinkovich and Olsen (2003), every derivative normal to an exterior boundary has a wave field dissipation operator applied. Several issues arise with standard PML operators. For general anisotropy, if the group velocity and the phase velocity have different signs for the direction normal to the boundary, PML goes unstable and energy can be amplified rather than attenuated at the boundary. The conventional design of PML dissipates in the direction of phase velocity, not in the actual direction of energy propagation as will be discussed below in the detailed description section. In addition, for elastic or anisotropic elastic wave propagation, thin high-contrast shear-velocity velocity layers on the boundary can create instability due to boundary or interface waves not behaving like body waves and again having a phase velocity vector with a different sign compared to the group velocity vector component normal to the boundary.

An ad hoc fix to the thin high-contrast shear wave velocity anomaly in the boundary zone has been to smooth the shear velocity earth model in the PML boundary zone. The smoother on the shear wave velocity needs to honor the rock physics constraints for stability and can be sensitive to how a full waveform inversion updates parameters near the boundary.

The frequency-domain form of the PML operator (eqn. 1)

$$\left(\frac{\partial}{\partial x_l}\right)_{PML} F(\vec{x}) = \left(\frac{1}{1 + \frac{\omega_l(\vec{x})}{i\omega}}\right)\left(\frac{\partial}{\partial x_l}\right)F(\vec{x}) \quad (1)$$

and the non-split PML (NPML) operator (eqn. 2)

$$\left(\frac{\partial}{\partial x_l}\right)_{NPML} F(\vec{x}) = \left(\frac{\partial}{\partial x_l}\right)\left(\frac{1}{1 + \frac{\omega_l(\vec{x})}{i\omega}}\right)F(\vec{x}) \quad (2)$$

to be associated with spatial derivative terms are given above. The NPML can be easier to implement, but the results may not be as good as those achieved with the PML. To mitigate reflections from an external earth model boundary, derivative terms in the original set of wave propagation equations are replaced with either PML or NPML derivatives which damp the waves propagating to and from the boundary. In three-dimensional space, l=1, 2 or 3, and the above formulation allows the frequency in a direction normal to the boundary, which may be called the damping frequency parameter to be different from the damping frequency parameter in the other two directions. In the time domain, these operators correspond to a temporal convolution with a damped exponential in time. The difference between the PML operator and the NPML operator is an exchange of the order of the spatial derivative and the dissipation operator. These two operators are transposes of each other. They are not identical because the damping coefficients are spatially dependent. The dissipation operator $D_l$ can accordingly be defined in the frequency domain as $$D_l(\omega, \vec{x}) = \left(\frac{1}{1 + \frac{\omega_l(\vec{x})}{i\omega}}\right) \quad (3)$$

where $\omega_l$ may be called the damping frequency parameter and $\omega$ is the frequency of propagation.

SUMMARY

A method for exploring for hydrocarbons, including: simulating a seismic waveform, using a computer, wherein computations are performed on a computational grid representing a subsurface region, said computational grid using perfectly matched layer (PML) boundary conditions that use an energy dissipation operator to minimize non-physical wave reflections at grid boundaries; wherein, in the simulation, the PML boundary conditions are defined to reduce computational instabilities at a boundary by steps including, representing direction of energy propagation by a Poynting vector, and dissipating energy, with the dissipation operator, in a direction of energy propagation instead of in a phase velocity direction; and using the simulated waveform in performing full waveform inversion or reverse time migration of seismic data, and using a physical property model from the inversion or a subsurface image from the migration to explore for hydrocarbons.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present technological advancement.

DETAILED DESCRIPTION

Exemplary embodiments are described herein. However, to the extent that the following description is specific to a particular, this is intended to be for exemplary purposes only and simply provides a description of the exemplary embodiments. Accordingly, the present technological advancement is not limited to the specific embodiments described below, but rather, it includes all alternatives, modifications, and equivalents falling within the true spirit and scope of the appended claims.

Perfectly Matched Layer (PML) boundary conditions are used to simulate non-reflecting external boundaries of a computational earth model in applications such as seismic simulation, reverse time depth migration (RTM) and full waveform inversion (FWI). Unfortunately, these boundary conditions have instabilities for several situations of critical interest for these applications. Particularly for the full wave form inversion application, the earth model is regularly and automatically updated and the algorithm will fail if the boundary conditions go unstable due to earth model modifications near the boundary zone. Typically, these instabilities occur whenever the group velocity vector normal to a boundary is in the opposite direction to the phase velocity vector. Two causes of that condition are commonly encountered; seismic anisotropy for certain types, and levels of anisotropy. Thin high-contrast shear velocity zones extending into the boundary zone may also make this happen.

The present technological advancement can provide a stable solution to this problem enabling full wave form inversion to proceed efficiently. For the seismic simulation and RTM applications, the present technological advancement can simplify and stabilize the earth model building process by providing more stable boundary conditions that work properly for a wider range of earth models.

In an exemplary embodiment, the PML/NPML work flow is modified to dissipate the energy associated with wave propagation normal to the boundary. The direction of energy propagation for anisotropic visco-elastic wave propagation is given by the Poynting vector represented by P below, and defined in terms of the stress tensor $\sigma_{ij}$ and the particle velocity vector $v_j$.

$$P_i = -\sigma_{ij} v_j \quad (4)$$

The Poynting vector describes energy flow for body waves, interface waves, guided waves and inhomogeneous waves in isotropic and anisotropic media. If a spatial derivative of the Poynting vector is taken normal to a boundary, then by the chain rule of differential calculus, this involves taking spatial derivatives of stress normal to the boundary scaled by particle velocity plus additional terms involving stress scaled by spatial derivatives of particle velocity normal to the boundary. These spatial derivatives normal to the boundary are the ones to be dissipated in the exemplary embodiment. Below is the directional spatial derivative of the $i^{th}$ component of the Poynting vector in the $k^{th}$ direction.

$$\frac{\partial P_i}{\partial x_k} = -\left(\frac{\partial \sigma_{ij}}{\partial x_k} v_j + \sigma_{ij}\frac{\partial v_j}{\partial x_k}\right) \quad (5)$$

For simulation on a Cartesian grid, then the directions normal to a boundary are the same as the directions spatial derivatives are taken for computing strain rate or divergence of stress. Therefore, those spatial derivatives in directions normal to the boundary are the terms that should be dissipated to ensure small energy flow to or from the boundary. Therefore k will be equal to i for dissipation of the Poynting vector in the $k^{th}$ direction. This is denoted using the Kronecker delta notation below. This is a frequency-domain equation and the dissipation operator $D_k$ is in the frequency domain.

$$D_k \frac{\partial P_i}{\partial x_k}\delta_{ik} = -D_k\left(\frac{\partial \sigma_{ij}}{\partial x_k} v_j + \sigma_{ij}\frac{\partial v_j}{\partial x_k}\right)\delta_{ik} \quad (6)$$

Converting from particle velocity to particle displacement and applying the Kronecker delta on the right hand side yields the following.

$$D_k \frac{\partial P_i}{\partial x_k}\delta_{ik} = -D_k\left(\frac{\partial \sigma_{kj}}{\partial x_k} v_j + \sigma_{kj}\frac{\partial v_j}{\partial x_k}\right) = -i\omega D_k\left(\frac{\partial \sigma_{kj}}{\partial x_k} u_j + \sigma_{kj}\varepsilon_{kj}\right) \quad (7)$$

where $u_j$ is displacement and $\varepsilon_{kj}$ is the strain tensor. In the frequency domain, these factors are all multiplicative. It is easy to see that applying the dissipation operator in the $k^{th}$ direction on a stress component that includes index k will dissipate the Poynting vector in the $k^{th}$ direction. Likewise, the same is true for such an operator applied to a strain component that includes index k.

Any boundary condition needs to be studied in terms of stability. The total strain energy E in a system can be written in terms of either (a) strain and stiffness $c_{ijkl}$ or (b) stress and compliance $s_{ijkl}$.

$$E = \frac{1}{2}\varepsilon_{ij}c_{ijkl}\varepsilon_{kl} = \frac{1}{2}\sigma_{ij}s_{ijkl}\sigma_{kl} \quad (8)$$

For stable rocks, the stiffness and compliance tensors are positive definite. Therefore any method that dissipates either strain or stress (or both) will reduce the total strain energy in the system and have stable characteristics.

Note that each Poynting vector boundary zone dissipation operator applied to dissipate the Poynting vector normal to the boundary can have the following characteristics. (1) The application of the boundary zone dissipation operator to the strain tensor keeps the strain tensor real and symmetric. (2) The application of the boundary zone dissipation operator to the stress tensor keeps the stress tensor real and symmetric. (3) The strain tensor mentioned in (1) can be strain with temporal derivatives or integrals of any order applied and the Poynting vector will still be dissipated. (4) The stress tensor mentioned in (2) can be stress with temporal derivatives or integrals of any order applied and the Poynting vector will still be dissipated.

The kinetic energy (per unit volume) in the system is the following.

$$E_{kinetic} = \frac{1}{2}\rho v_i^2 \qquad (9)$$

Figure 1:
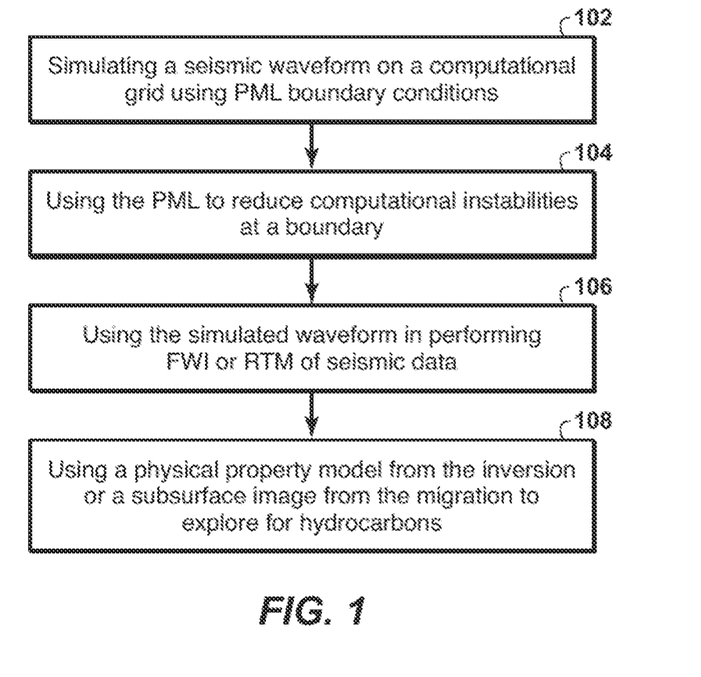
FIG. 1 is a flow chart of an exemplary embodiment of the present technological advancement.

FIG. 1 is an exemplary method that embodies the present technological advancement. Step 102 includes simulating a seismic waveform, using a computer, wherein computations are performed on a computational grid representing a subsurface region, said computational grid using perfectly matched layer (PML) boundary conditions that use an energy dissipation operator to minimize non-physical wave reflections at grid boundaries (i.e., noise or those reflections at the boundaries that do not correspond to reflections from geological objects, as wave should not reflect from external boundaries of the computational model during the simulation). In the simulation, according to step 104, the PML can be modified to reduce computational instabilities at a boundary. Step 106 includes using the simulated waveform in performing full waveform inversion or reverse time migration of seismic data, and using a physical property model from the inversion or a subsurface image from the migration to explore for hydrocarbons. Step 108 includes using a physical property model from the inversion or a subsurface image from the migration to explore for or manage hydrocarbons. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Figure 2:
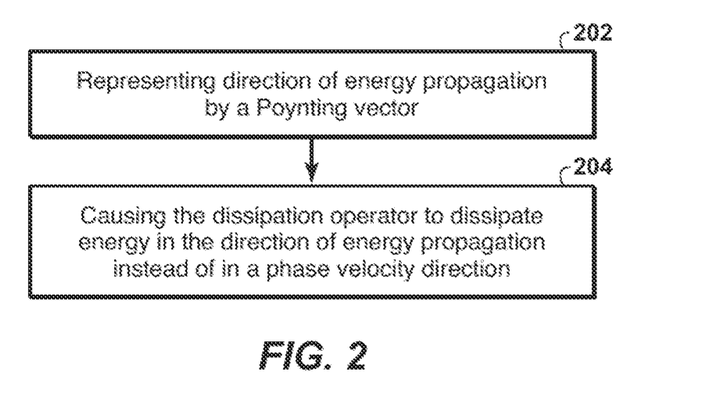
FIG. 2 is a flow chart of exemplary method for modifying the PML to reduce computational instabilities at a boundary.

FIG. 2 is an exemplary method for implementing step 104 (i.e., an exemplary method for modifying the PML to reduce computational instabilities at a boundary). Step 202 includes representing direction of energy propagation by a Poynting vector. Step 204 includes causing the dissipation operator to dissipate energy in the direction of energy propagation instead of in a phase velocity direction.

One embodiment of the present technological advancement may be described as follows. $\omega_i$ in the PML and NPML operators can be replaced by $\omega_{jk}$, with j and k referring to the directions associated with the derivatives used to compute either (a) strain or (b) divergence of the stress. $n_{PML}$ can be defined as the number of points in the PML boundary zone. First, the spatial derivatives are taken to create the strains and then dissipate the strains so that the order of the operators (e.g., whether the damping operator is performed first prior to the derivative (NPML) or the derivative is applied first and then damped (PML)) given matches that for PML. The damping frequency can be computed for derivatives in the $j^{th}$ direction and the $k^{th}$ direction as follows. (Here, the PML zone spatial length $L_{PML}$ is defined in terms of the spatial increment h and the number of grid points in the PML zone as $L_{PML} = h \, n_{PML}$. The scale factor of 2.25 is a number that works well for many applications; however it is not unique to the technological advancement and other scale factors can be used.

$$\omega_{jk} = 2.25 v_{max} \frac{\ln(n_{PML})}{L_{PML}} \left[ \left( \frac{L_{PML} - x_j}{L_{PML}} \right)^2 + \left( \frac{L_{PML} - x_k}{L_{PML}} \right)^2 \right] \qquad (10)$$

The two indices jk replace the single index l shown in Eqn. (3) to deal with situations where the stress (or strain?) tensor has non-zero off diagonal elements. In the frequency domain, the dissipation operator $D_{jk}$ for the present technological advancement can be written as follows.

$$D_{jk}(\omega, \vec{x}) = \frac{1}{1 + \frac{\omega_{jk}(\vec{x})}{i\omega}} \qquad (11)$$

For a finite difference implementation, the $D_{jk}$ operators should honor any grid staggering associated with a staggered grid (a grid where different stress components are defined on different grids that are staggered relative to each other) finite difference scheme.

For a frequency domain implementation, dissipation can be applied using the $D_{jk}$ operator to each Voigt strain and stress component in the boundary zone. This is exactly PML for the normal strains or normal stresses when j equals k. This formulation is not strictly PML for the shear strains or shear stresses where j does not equal k. Instead this is dissipation applied in a way that improves stability for elastic propagation, as no unbalanced torque is ever applied and total strain energy is always decreased. In this formulation, Poynting vectors for energy propagation normal to the boundary are always dissipated for any type of anisotropy.

For a time domain implementation, the following work flow can be used. An additional advantage to the present technological advancement in the time domain compared to standard PML algorithms is that fewer memory variables are used, helping to improve the balance between the memory allocations in the boundary zone versus that in the interior. The temporal convolution of the computed strain with the damped exponential can be computed via the following steps using an associated memory variable.

$$B = e^{-\omega_{jk}|\Delta t|}$$

$$A = B - 1$$

$$\phi_{jk}^{n_t} = B\phi_{jk}^{n_t-1} + A\varepsilon_{jk}$$

$$\varepsilon_{jk}^{pml} = \varepsilon_{jk} + \phi_{jk}^{n_t} \qquad 12$$

$\varepsilon$ is a strain (or stress) and $\varphi$ is a memory variable. The dissipation operator on strain components and strain memory variables can be written as one matrix operator step. This time domain operator corresponds to the PML algorithm.

$$\begin{bmatrix} B & 1-B \\ B & 2-B \end{bmatrix} \begin{bmatrix} \varphi_{jk}^{n-1} \\ \varepsilon_{jk} \end{bmatrix} = \begin{bmatrix} \varphi_{jk}^{n} \\ \varepsilon_{jk}^{pml} \end{bmatrix} \qquad (13)$$

The matrix $D_{jk}$ is defined to be the time domain dissipation operator.

$$D_{jk} = \begin{bmatrix} B & 1-B \\ B & 2-B \end{bmatrix} \quad (14)$$

The transpose dissipation operator on stress and stress memory variables can also be written as one matrix operator step. This operator corresponds to the NPML algorithm.

$$\begin{bmatrix} B & B \\ 1-B & 2-B \end{bmatrix} \begin{bmatrix} \varphi_{\sigma_{jk}}^{n-1} \\ \sigma_{jk} \end{bmatrix} = \begin{bmatrix} \varphi_{\sigma_{jk}}^{n} \\ \sigma_{jk}^{pml} \end{bmatrix} \quad (15)$$

The matrix $D_{jk}^T$ is defined to be the transpose time domain dissipation operator.

Putting everything together provides a formula for computing density-weighted particle acceleration as a function of displacement and a system of operators that equal its own transpose. This type of operator design is useful for developing wave propagation operators with matching adjoint wave propagation operators for applications related to reverse time depth migration or full waveform inversion. The following equation (16) shows how this can be done, and is applicable to both the time domain and the frequency domain.

$$\rho \begin{bmatrix} a_1 \\ a_2 \\ a_3 \end{bmatrix} = \begin{bmatrix} \frac{\partial}{\partial x_1} & 0 & 0 & 0 & \frac{\partial}{\partial x_3} & \frac{\partial}{\partial x_2} \\ 0 & \frac{\partial}{\partial x_2} & 0 & \frac{\partial}{\partial x_3} & 0 & \frac{\partial}{\partial x_1} \\ 0 & 0 & \frac{\partial}{\partial x_3} & \frac{\partial}{\partial x_2} & \frac{\partial}{\partial x_1} & 0 \end{bmatrix} \quad (16)$$

$$\begin{bmatrix} D_{11}^T & 0 & 0 & 0 & 0 & 0 \\ 0 & D_{22}^T & 0 & 0 & 0 & 0 \\ 0 & 0 & D_{33}^T & 0 & 0 & 0 \\ 0 & 0 & 0 & D_{44}^T & 0 & 0 \\ 0 & 0 & 0 & 0 & D_{55}^T & 0 \\ 0 & 0 & 0 & 0 & 0 & D_{66}^T \end{bmatrix} \times$$

$$\begin{pmatrix} C_{11} & C_{12} & C_{13} & C_{14} & C_{15} & C_{16} \\ C_{12} & C_{22} & C_{23} & C_{24} & C_{25} & C_{26} \\ C_{13} & C_{23} & C_{33} & C_{34} & C_{35} & C_{36} \\ C_{14} & C_{24} & C_{34} & C_{44} & C_{45} & C_{46} \\ C_{15} & C_{25} & C_{35} & C_{45} & C_{55} & C_{56} \\ C_{16} & C_{26} & C_{36} & C_{46} & C_{56} & C_{66} \end{pmatrix}$$

$$\begin{bmatrix} D_{11} & 0 & 0 & 0 & 0 & 0 \\ 0 & D_{22} & 0 & 0 & 0 & 0 \\ 0 & 0 & D_{33} & 0 & 0 & 0 \\ 0 & 0 & 0 & D_{44} & 0 & 0 \\ 0 & 0 & 0 & 0 & D_{55} & 0 \\ 0 & 0 & 0 & 0 & 0 & D_{66} \end{bmatrix} \begin{bmatrix} \frac{\partial}{\partial x_1} & 0 & 0 \\ 0 & \frac{\partial}{\partial x_2} & 0 \\ 0 & 0 & \frac{\partial}{\partial x_3} \\ 0 & \frac{\partial}{\partial x_3} & \frac{\partial}{\partial x_2} \\ \frac{\partial}{\partial x_3} & 0 & \frac{\partial}{\partial x_1} \\ \frac{\partial}{\partial x_2} & \frac{\partial}{\partial x_1} & 0 \end{bmatrix} \begin{bmatrix} u_1 \\ u_2 \\ u_3 \end{bmatrix}$$

Variations on this algorithm can be done to choose wave propagation state vectors as strain and particle velocity, particle velocity and acceleration, particle velocity and stress, or many other combinations that fully describe the wave propagation initial conditions from a combination of seismic wavefields. Another variation can include a small background dissipation term for waves propagating in any direction within the boundary zone.

Figure 3:
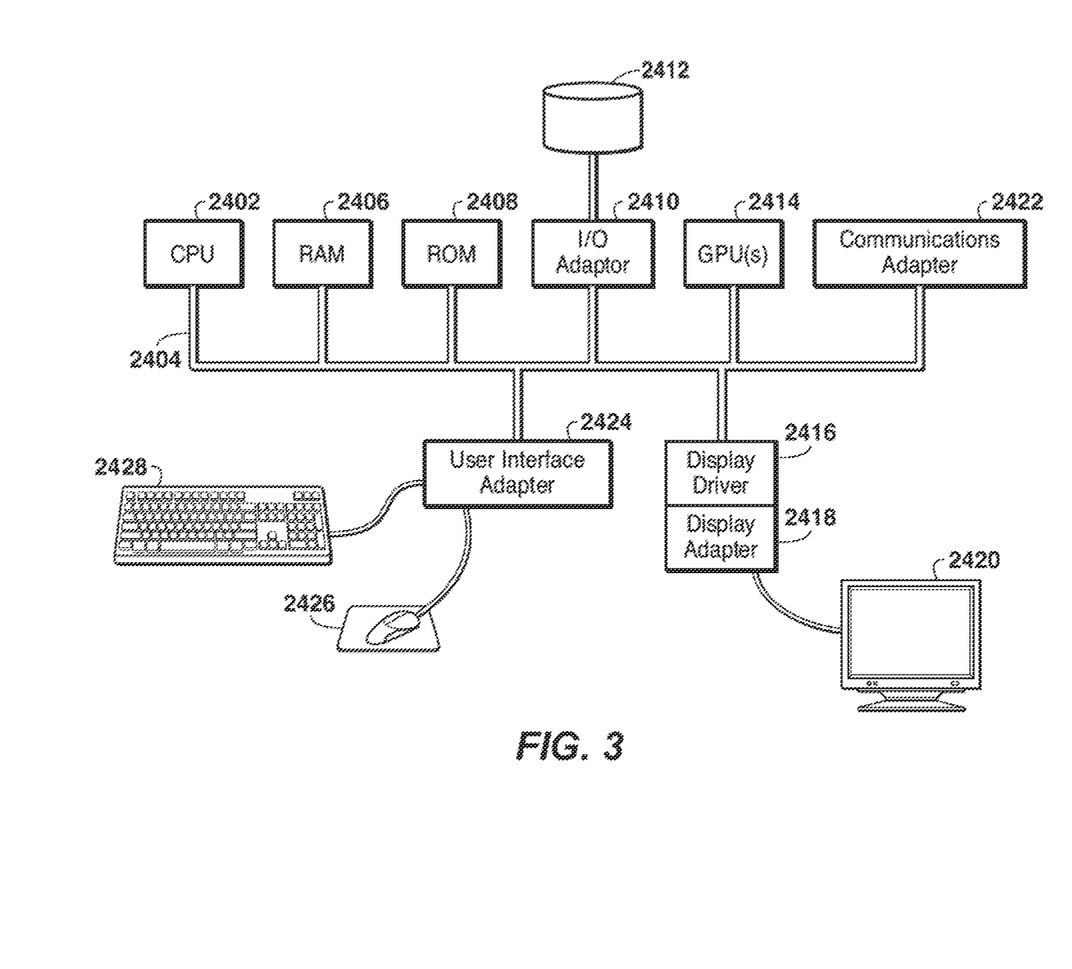
FIG. 3 is an exemplary computer system usable with the technological advancement.

In all practical applications, the present technological advancement must be used in conjunction with a computer, programmed in accordance with the disclosures herein. FIG. 3 provides an exemplary computer system upon which the present technological advancement may be embodied.

FIG. 3 is a block diagram of a computer system 2400 that can be used to generate the ASO. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 3, additional CPUs may be present. Moreover, the computer system 2400 may comprise a networked, multi-processor computer system that may include a hybrid parallel CPU/GPU system. The CPU 402 may execute the various logical instructions according to various teachings disclosed herein. For example, the CPU 2402 may execute machine-level instructions for performing processing according to the operational flow described.

The computer system 2400 may also include computer components such as non-transitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, a communications adapter 2422, a user interface adapter 2424, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 400. The display adapter 2418 is driven by the CPU 2402 to control the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

REFERENCES

1. Berenger, J., "A perfectly matched layer for the absorption of electromagnetic waves," *Journal of Computational Physics* 114, 185-200 (1994); doi:10.1006/jcph.1994.1159, which is incorporated by reference in its entirety.
2. Marcinkovich, C., K. Olsen, "On the implementation of perfectly matched layers in a three-dimensional fourth-order velocity-stress finite difference scheme," *Journal of Geophysical Research Solid Earth* 108, 2276 (2003), which is incorporated by reference in its entirety.

What is claimed is:

1. A method for exploring for hydrocarbons, comprising:
    simulating a seismic waveform, using a computer, wherein computations are performed on a computational grid representing a subsurface region, said computational grid using perfectly matched layer (PML) boundary conditions;
    wherein, in the simulation, the PML boundary conditions are defined to reduce computational instabilities at a boundary by steps including,
        representing direction of energy propagation by a Poynting vector, and
        dissipating energy that represents noise or reflections at the boundary that do not correspond to reflections from geological objects, with a dissipation operator operating on the Poynting vector, in a direction of energy propagation instead of in a phase velocity direction; and
    using the simulated waveform in performing full waveform inversion or reverse time migration of seismic data;
    obtaining a physical property model from the inversion or a subsurface image from the migration; and
    using the physical property model or the subsurface image to explore for hydrocarbons.

2. The method of claim 1, wherein the dissipating energy in the direction of energy propagation comprises dissipating energy associated with terms in the Poynting vector that involve spatial derivatives of particle velocity or stress that are normal to the boundary.

3. The method of claim 2, wherein the Poynting vector $P_i$ is given by $$P_i = -\sigma_{ij} v_j \tag{4}$$

where $\sigma_{ij}$ is a stress tensor and $v_j$ is a particle velocity vector.

4. The method of claim 1, wherein the subsurface region comprises anisotropic viscoelastic media.

* * * * *